Dec. 3, 1935.   O. W. FISHER ET AL   2,022,659
ELECTRICALLY CONTROLLED SCALE MECHANISM
Filed May 10, 1932   5 Sheets-Sheet 2
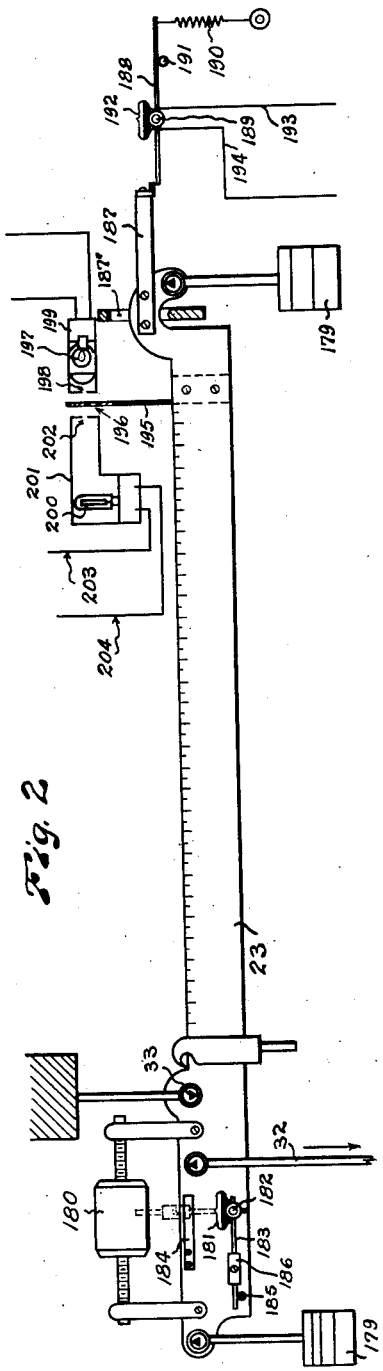
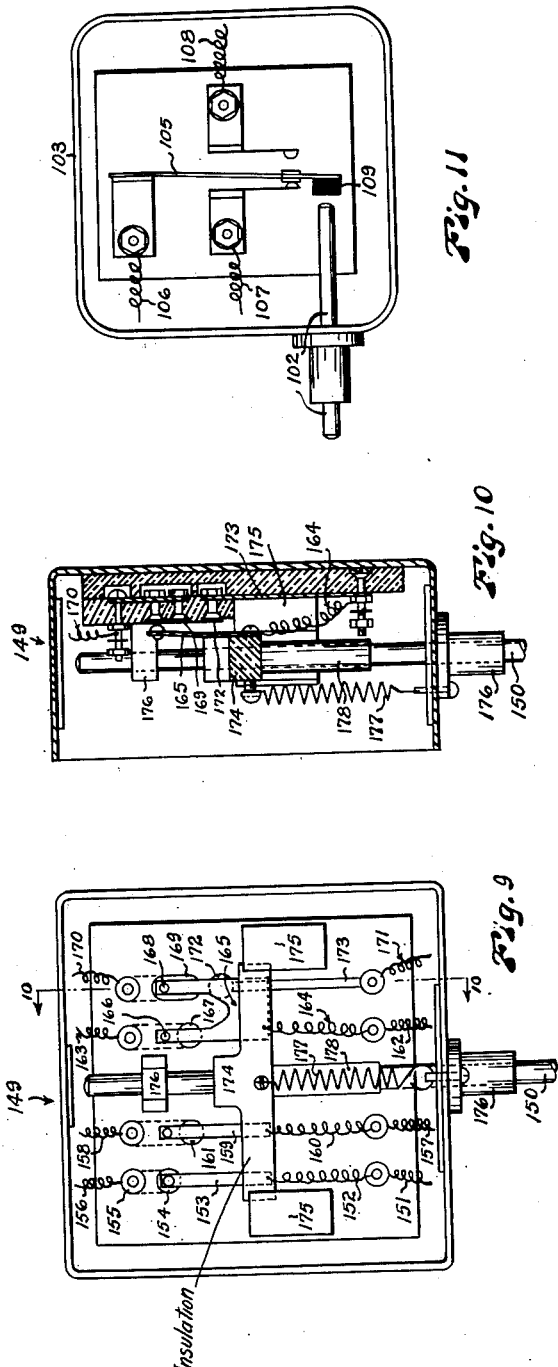
INVENTORS
Orin Wallace Fisher
Ralph E. Walter
BY
G. Wright Arnold
ATTORNEY Dec. 3, 1935.                    O. W. FISHER ET AL                    2,022,659
                        ELECTRICALLY CONTROLLED SCALE MECHANISM
                          Filed May 10, 1932          5 Sheets-Sheet 3
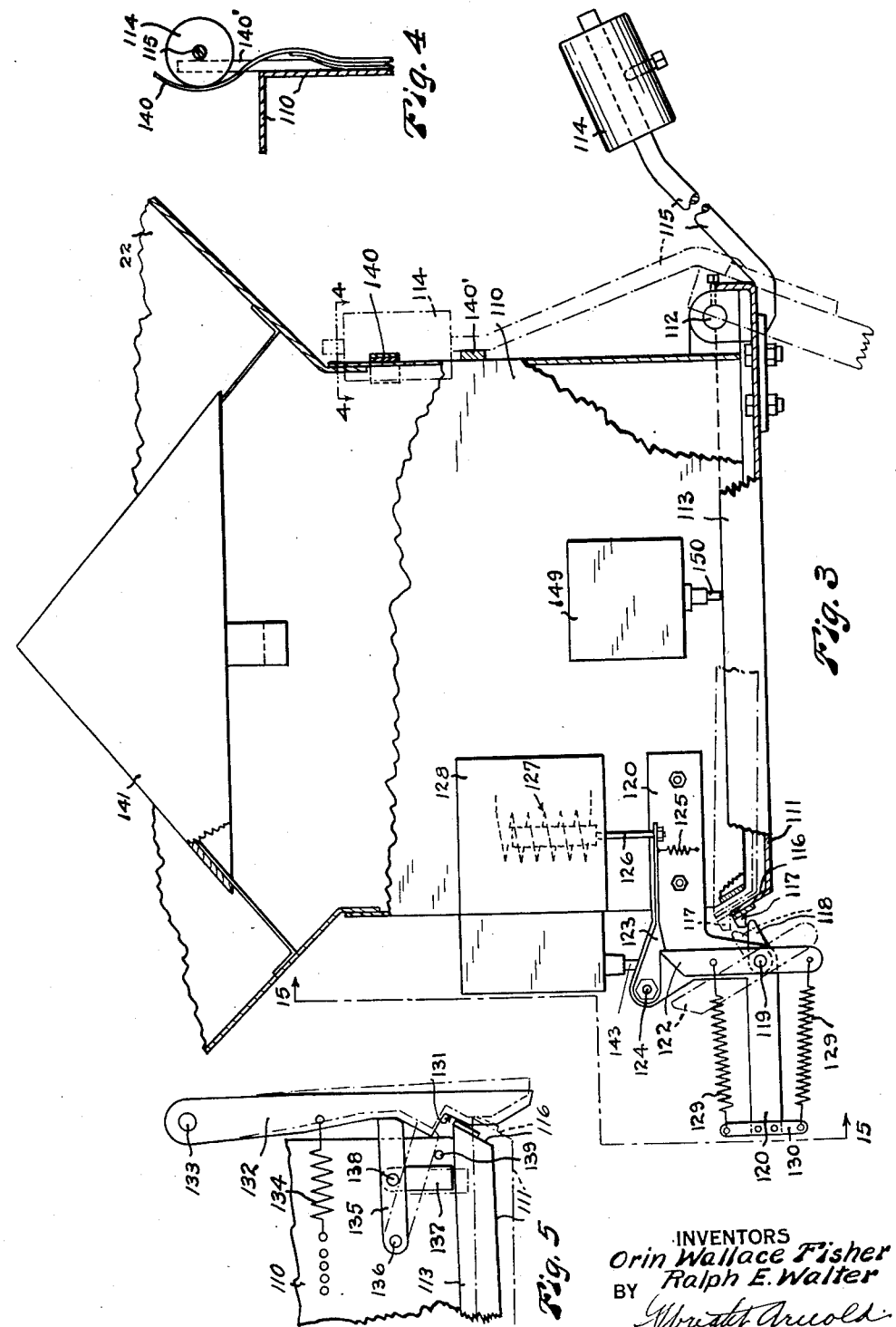
INVENTORS
Orin Wallace Fisher
Ralph E. Walter
BY
Wright Arnold
ATTORNEY Dec. 3, 1935.     O. W. FISHER ET AL     2,022,659
ELECTRICALLY CONTROLLED SCALE MECHANISM
Filed May 10, 1932     5 Sheets-Sheet 4
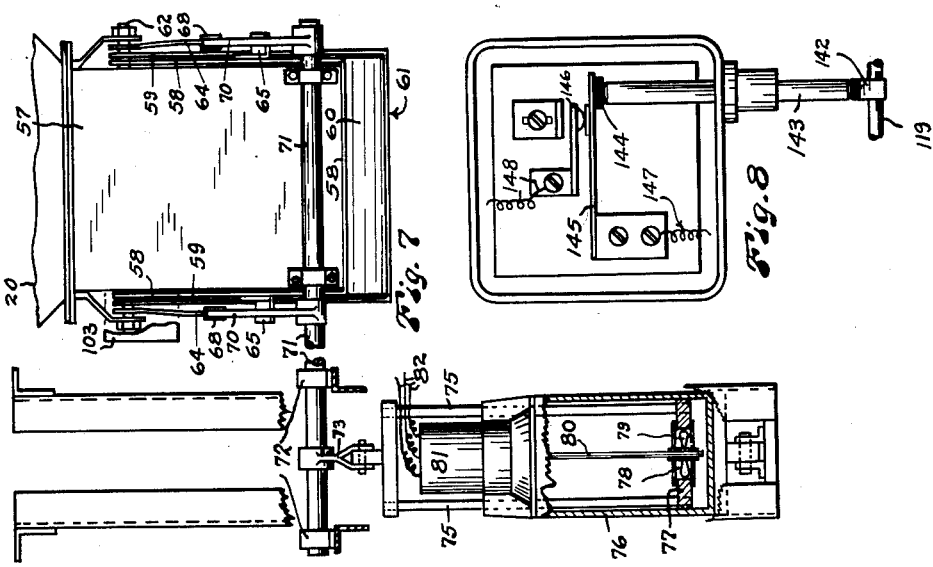
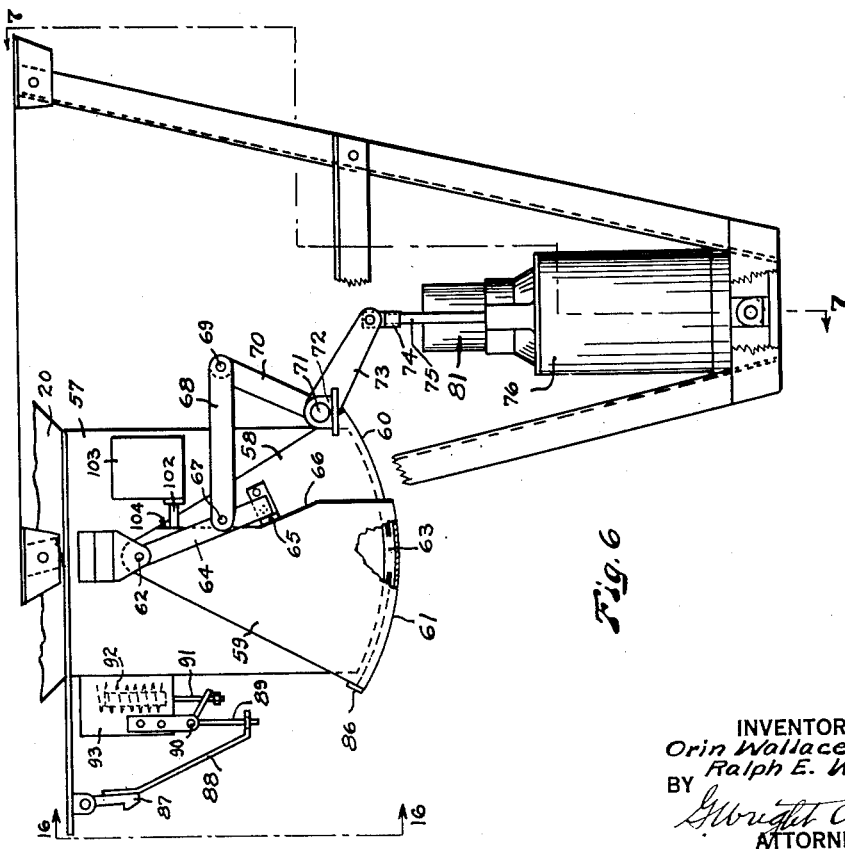
INVENTORS
Orin Wallace Fisher
Ralph E. Walter
BY
Wright Arnold
ATTORNEY Dec. 3, 1935.  O. W. FISHER ET AL  2,022,659
ELECTRICALLY CONTROLLED SCALE MECHANISM
Filed May 10, 1932  5 Sheets-Sheet 5
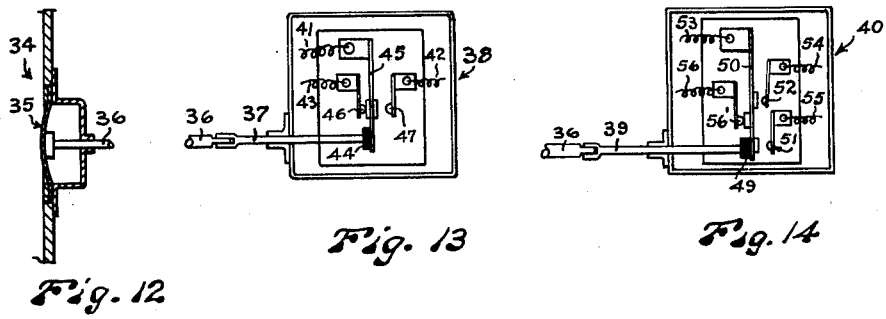
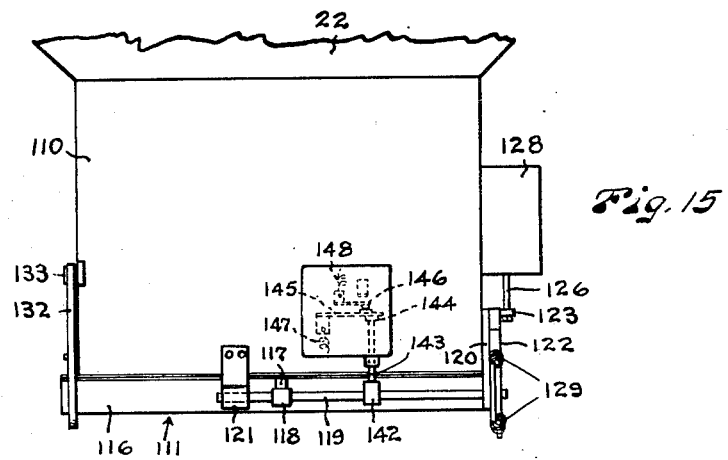
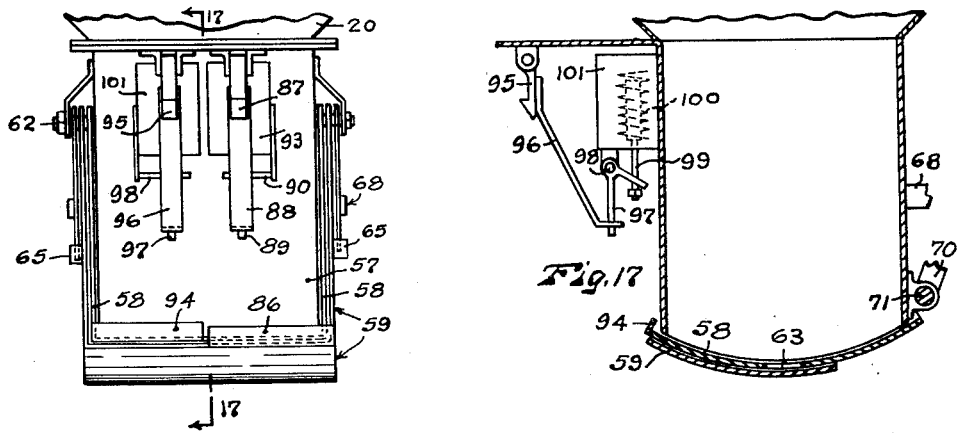
INVENTORS
Orin Wallace Fisher
BY Ralph E. Walter
ATTORNEY Patented Dec. 3, 1935

2,022,659

UNITED STATES PATENT OFFICE 2,022,659

ELECTRICALLY CONTROLLED SCALE MECHANISM

Orin Wallace Fisher and Ralph Edwin Walter, Seattle, Wash., assignors to Fisher Flouring Mills Co., Seattle, Wash., a corporation of Washington Application May 10, 1932, Serial No. 610,414

16 Claims. (Cl. 249—50)

Our invention relates to an electrically controlled scale mechanism.

In the weighing of bulk materials, in connection with grain elevators, huge quantities of material must be weighed in a short period of time, and the weighing must be accurate. In connection with this system, it is to be noted that the grain of many owners is of the intermixed in one elevator, and the ownership of the various owners is designated only by the weight of material delivered by such owners to the grain elevators.

Further, it is to be noted that the various States provide State weighers to watch the scales and protect the various owners. Scales to be used for such purposes must be accurate, and many States require that such scales must not contain springs or weighing apparatus which is subject to change.

Further, it is to be noted that many bushels per second must be delivered to the scale, and after weighing, rapidly discharged therefrom so that large quantities of material may be handled in a short period of time.

In these and many other places, material is permitted to descend by gravity from one bin to another, and an automatic accurate scale apparatus is needed to weigh such materials. Although many devices are now on the market having been designed to provide an accurate, foolproof, automatic scale, still they do not accomplish these ends. Another difficulty often encountered in present day weighing systems is that a breakdown in the apparatus turning off the flow of material will cause an overflow on the floor, which may be in quantities of carloads in a period of minutes, depending upon the capacity of the scale. Our device, on the other hand, has been proven to be a success in a large and most modern mill, and the following specific objects of our invention provide for an accurate, fool-proof automatic scale apparatus.

The primary object of our invention is to provide an automatic means for weighing and recording accurately the weight of any material which will flow freely from one receptacle to another.

More particularly it is the object of the invention to provide means, operated by but not physically connected to a scale beam, controlling the delivery of material to the scale and in turn the unloading of the material from the scale.

Another object of our invention is to provide means which may be used in connection with a movable scale beam for opening and closing electrical circuits without interfering in any way with the free operation of the scale beam.

Another object of our invention is to provide a scale apparatus having electrical switches controlled by the weight of material in the scale, and by discharging material from the scale.

Another object of our invention is to provide a scale apparatus which may be selectively adjusted either for automatic or manual control and operation.

Another object of our invention is to provide an electrically controlled scale apparatus operating in a predetermined sequence, so that improper operation of any part of the apparatus will prevent the operation of parts occurring later in the sequence, thus eliminating errors. Such operation in a pre-determined sequence further elminiates a possibility of error due to the manual operation of means at an incorrect period in the sequence of the operation.

Another object of our invention is to provide electrically controlled means for supplying material to the scale, and delivery of material therefrom, which electrically controlled means may be used as an attachment or accessory in connection with any scale provided with a balance beam.

Another object of our invention is to provide electrical means in the control circuits preventing inaccurate operation of the parts from affecting the accuracy of the weighing.

Another object of our invention is to provide automatic means for controlling the weighing of free-flowing materials, which automatic control means may be disconnected at any time, so that any quantity of material in the hopper may be weighed manually at any time and so that the scale beam may be checked for balance at any time when the hopper is empty.

Another object of our invention is to provide indicating means positioned at any convenient location to indicate the operative condition of the scale apparatus at all times.

The above mentioned general objects of our invention, together with others inherent in the same, are attained by the device, illustrated in the following drawings, the same being preferred exemplary forms and embodiment of our invention, throughout which drawings like reference numerals indicate like parts:

Figure 2 is a side elevation on a larger scale of the scale beam embodied in the invention showing diagrammatically certain electrical connections therewith.

Figure 3 is a view partly in elevation and partly in section, on a larger scale showing the lower portion, the upper portion being broken away, of the scale hopper.

Figure 4 is a fragmentary plan view substantially on a broken line 4—4 of Figure 3, with the counter weights elevated.

Figure 5 is a detached fragmentary elevation of a device positioned on the lower portion of the scale hopper on the side opposite to that shown in Figure 3, and adapted to yieldingly hold the scale valve in fully closed position when the scale is completely empty.

Figure 6 is a side elevation with parts broken away, showing the lower portion of the bin including the bin valves and the operating mechanism therefor.

Figure 7 is a view partly in section and partly in elevation, substantially on broken line 7—7 of Figure 6.

Figure 8 is a view in elevation with the cover removed of a lock switch operated by the locking and unlocking of the scale valve.

Figure 9 is a view in elevation with the cover removed of an indicator switch connected to the lower portion of the scale hopper and operable by the scale valve for indicating the positions of such valve.

Figure 10 is a view substantially on broken line 10—10 of Figure 9.

Figure 11 is a view in elevation with the cover removed, of an electrical switch positioned upon the lower portion of the bin, and operated by the opening and closing of the bin valves.

Figure 12 is a fragmentary sectional view illustrating pressure responsive means used in both the bin and the scale hopper and adapted to be operated by an abnormal level of material in said bin or hopper.

Figure 13 is a view in elevation with the cover removed of a bin switch operated by the pressure responsive means in the bin and shown in Figure 12.

Figure 14 is a view in elevation with the cover removed, of a scale switch operated by the pressure responsive means in the scale hopper and shown in Figure 12.

Figure 15 is a view in elevation substantially on broken line 15—15 of Figure 3.

Figure 16 is a fragmentary rear elevation of the boot portion of the bin substantially on broken line 16—16 of Figure 6, showing the rear edges of the main bin valve and dribble bin valve, and showing the positions of the mechanism for holding said two valves open.

Figure 17 is a fragmentary view partly in elevation and partly in section substantially on broken line 17—17 of Figure 16, showing the mechanism for holding the main bin valve open, the mechanism for holding the dribble bin valve open being shown in Figure 6.

Figure 1:
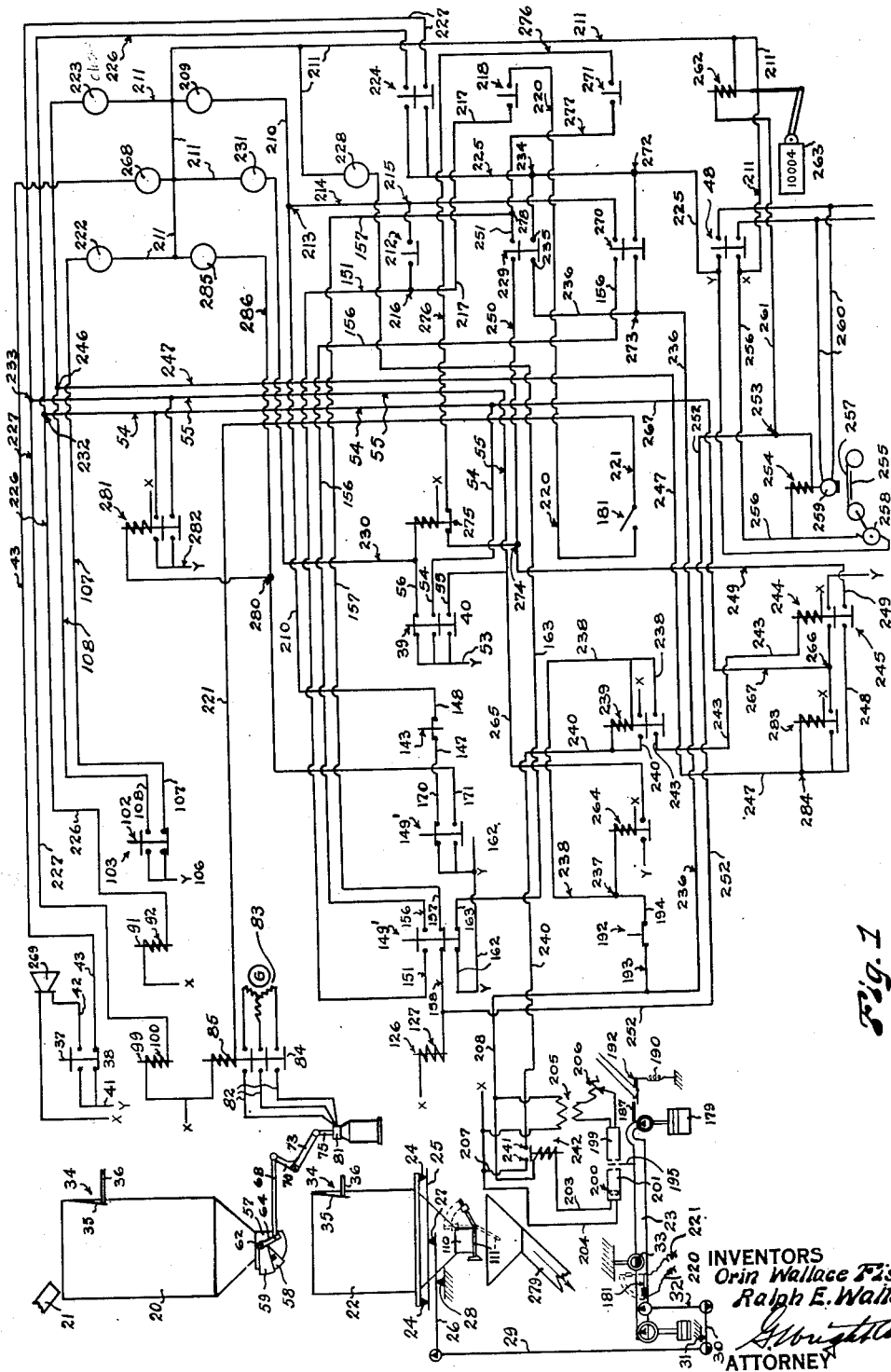
Figure 1 is a combined wiring diagram and schematic showing of apparatus constructed in accordance with our invention.

Referring to the diagrammatic showing of the parts in Figure 1, 20 indicates a bin for the storage of material to be weighed, such as grain, provided with a conveyor means indicated generally by 21 for filling such bin. Positioned below the bin 20 in a position to receive the material discharged from the bin, is a scale hopper 22 which is connected by any suitable means to the scale beam 23. In the drawings, such connection is shown schematically by providing pivot points 24 of scale hopper 22, which rest upon a supporting member 25. Supporting member 25 rests upon beam member 26 at pivot point 27. Beam member 26 rests upon fulcrum 28. Link member 29 connects beam member 26 to a short beam member 30, which short beam member is fulcrumed at 31. Link member 32 connects short beam member 30 to the scale beam 23, which is fulcrumed at 33. This arrangement of links and scale beams provides for the reduction of weight upon the scale beam 23, and may be varied according to well known scale principles to accommodate the scale for various capacities of weighing, the above setting forth schematically only one manner of accomplishing this purpose.

Referring more specifically to the bin 20 and the scale hopper 22, pressure responsive devices 34, which may be of duplicate construction, are provided at the upper portion of the said bin 20 and hopper 22 at a position normally above the operating level of material in the bin and hopper.

Referring to Fig. 12, a pressure responsive means 34 is preferably constructed with a rubber diaphragm 35 and a plunger 36. As the level of the material, such as grain, rises in the bin or scale hopper above the normal operating level of the material, a pressure against the diaphragm 35 causes the plunger 36 to move outwardly.

The plunger 36 of the pressure responsive device in the bin 20 is connected with the operating rod 37 of a bin switch 38 illustrated diagrammatically in Figure 1, and shown in more detail in Fig. 13. The plunger 36 of the pressure responsive device in the scale hopper 22 is connected with the operating rod 39 of a scale switch 40 illustrated diagrammatically in Figure 1, and shown in more detail in Fig. 14.

Referring to Fig. 13, with the rise of material in the bin 20, adjacent the pressure responsive means 34, the operating rod 37 is moved outwardly causing an electrical connection between conductors 41 and 42, and at the same time causing the conductors 41 and 43, which were previously connected, to become disconnected, the effect of which will be particularly discussed in connection with the wiring diagram. As the operating rod 36 in the bin 20 is moved outwardly, the plunger 37 exerts a pressure against insulating block 44 which is connected to spring member 45 which spring member 45 is normally held by the pressure of the spring against the operating rod 37. When in normal position, (see Fig. 1) the spring member 45 causes an electrical connection between the "Y" energy at 41, through the spring member 45, to the contact point 46, and thence to conducor 43. As the pressure is exerted upon the operating rod 37, due to the level of the material in the bin 20, the spring member 45 is urged away from the contact point 46, and connects with the contact point 47, permitting the "Y" energy from point 41 to connect to conductor 42.

In connection with the switches and conductors used throughout this device, the term "Y energy" will be applied to one conductor, and the term "X energy" will be applied to the other conductor for the purpose of clearness. In this connection, the drawings will be somewhat diagrammatic to prevent overlapping of lines, and it will be understood that in each instance where the term X is applied to the drawings, that a conductor from this point to the main switch is actually used but not shown, as the showing of such conductor would tend to confuse the drawings. The main switch just referred to, in every instance, shall be switch 48.

Referring to Figure 14, as the material rises above the normal operating level of material in the scale hopper 22, the pressure responsive device 34 will operate in a similar manner as that described in connection with the bin 20. Under such conditions, the operating rod 36 of the pressure responsive device will urge the operating rod 39 of the scale switch 40 against the insulating block 49 attached to the spring member 50, and will engage the spring 50 with the contact members 51 and 52, permitting Y energy from 53 to flow to conductors 54 and 55, and spring member 56' will be disengaged from the conductor 56. When the operating rod 39 of the scale switch 40 is retracted, due to the absence of material above and adjacent the responsive member 34 in the scale hopper 22, the spring member 50 will be returned to its normal position, and a connection between spring member 50 and conductor 56 will thereby result, causing Y energy from 53 to be connected to conductor 56.

At the bottom of the bin 20 (see Fig. 6) is provided a boot 57 having a main bin valve 58 and a dribble bin valve 59 controlling the discharge therefrom. The boot 57 is open at the bottom, and the bottom of said boot is of an arcuate shape. The main bin valve 58 and the dribble bin valve 59 have curved or arcuate bottom portions 60 and 61, respectively, operable in close proximity to the bottom of the boot, and are further provided with side portions which extend upwardly on opposite sides of the boot, and are pivoted as at 62. When the main bin valve 58 and the dribble bin valve 59 are in the fully closed position, shown in Fig. 6, discharge of material from the bin is prevented. When both of said valves 58 and 59 are to the left from the position shown in Fig. 6 to the position shown in Figure 1, the bottom of the boot is opened and the discharge of material is permitted. A small opening 63 is provided in the bottom of the main bin valve through which a small amount or dribble of material may discharge when the main bin valve is closed, and the dribble bin valve is open. The provision of the dribble opening 63, with dribble valve 59 for closing same, makes it possible to cut off the main stream of material just before the desired weight has accumulated in the scale hopper 22, and to use a smaller dribble stream to bring the weight in the scale hopper to the desired limit, thus operating in a well known manner to make possible more accurate weighing.

A dribble bin valve 59 and main bin valve 58 are arranged so that they both open at the same time, and are held in the open position by separate catch means so that they may be released and allowed to close independent of each other, the main bin valve 58 closing first, and the dribble bin valve 59 closing later. These valves may both close by gravity and may be opened by various different mechanisms, one of which is hereinafter described.

The mechanism herein disclosed (see Figs. 6 and 7) for opening the main bin valve 58 and the dribble bin valve 59 consists in two bars 64 positioned on opposite sides of the bin valves, each having one end pivoted on the pivot 62, and the other end contacting fixed brackets 65, attached to the main bin valve 58, the brackets 65 being positioned for engagement with edges 66 of the dribble bin valve 59. The bars 64 are respectively connected by pivots 67, with links 68, which in turn are connected by pivots 69 with lever arms 70 on a transverse shaft 71 which is mounted in bearing 72. The shaft 71 extends outwardly to one side of the boot 57, and is provided with the lever arm 73 which is pivotally connected with the upper end of a plunger comprising yoke 74 connected with two members 75, which extend downwardly into a cylinder 76, and are connected with a piston member 77. The piston member 77 has a central opening 78 within which is positioned a rotary impeller 79, which is splined on a shaft 80. The shaft 80 extends upwardly and is connected with a motor 81 mounted on the top of the cylinder 76. The cylinder 76 contains a liquid, as oil. When the impeller 79 is at rest, the piston 77, rods 75, and parts connected therewith, descend by gravity to the lower end of the cylinder 76. When the motor is started, and the impeller 79 rotated, it will tend to force the liquid from above the piston 77 down below the said piston 77, and will cause the piston 77 and rods 75 to move upwardly, thus operating through lever arms 73, shaft 71, levers 70, links 68 and bars 64 to open the main bin valve 58 and the dribble bin valve 59. The hydraulic mechanism just described for opening the bin valves is a well-known form, being commonly termed "thruster." Electric motor 81 is connected by suitable conductors, such as 82, to a source of energy indicated by 83, through solenoid operated electrical switch 84, (shown in Figure 1). The control of the solenoid 85 operating the switch 84, and in turn the main bin valve 58 and dribble bin valve 59 will be discussed more particularly in connection with the wiring diagram.

A bar 86, (see Figures 6 and 16) is provided on the rear edge of the dribble bin valve 59 and is arranged to engage with a hook 87 when the dribble bin valve is open, said hook serving to hold the dribble bin valve in an open position. Electrically operated release means for the hook 87 may be provided in the form of an arm 88 extending downwardly at an incline from said hook, and having engagement at its bottom end with a bell crank lever 89, which is pivoted at 90, and is engaged by a plunger 91, which is operated by a solenoid 92 in a housing 93. When the solenoid 92 is energized, the plunger 91 is moved upwardly, and the bell crank 89 is oscillated and moves the hook 87 inwardly into release position, thereby releasing the dribble bin valve 59 and permitting it to close by gravity.

The main bin valve 58, (see Figures 16 and 17) is held in an elevated position by mechanism which is substantially the form as the mechanism just described in connection with the dribble bin valve 59. This mechanism for holding the main bin valve in open position comprises a bar 94 on the rear end of said main bin valve which is arranged to be engaged by a hook 95 connected by an arm 96, with a bell crank lever 97, pivoted at 98 and operated by the plunger 99 of a solenoid 100 mounted within a housing 101.

A plunger 102 of an electrical switch 103 (see Figures 1, 6, and 11) is positioned adjacent a shoulder 104 of the dribble bin valve 59.

Referring to Figure 11, a spring member 105 is provided, normally causing the Y energy at 106 to connect with conductor 107. In this position, the dribble bin valve 59 is open and when the same is permitted to close, a pressure is provided against plunger 102, disconnecting the connection between 106 and 107, and causing an electrical connection between the Y energy on conductor 106 and the conductor 108. Plunger 102 operates upon an insulated block 109 as described in connection with other electrical switches.

The bottom of the scale hopper 22 is provided with a boot 110, (Figure 3) which is open at the bottom, and is adapted to be closed by a scale valve 111 which is swingingly mounted on a pivot 112. The scale valve 111 is preferably larger than the bottom of the boot 110 and is provided with upwardly turned edges 113 which extend over the outside of the boot 110. Counterweights 114 are adjustably mounted on lever arms 115 which are fixedly secured to the scale valve 111, said counterweights serving to return the scale valve 111 to the closed position when no material is discharging from the boot 110. The edge 113 of the scale valve 111 on the opposite side from the pivot 112 is inclined as at 116, and is provided with a catch member 117 arranged to engage with a locking lug 118, on a shaft 119. The shaft 119 is journaled in a bracket member 20, which is secured to the boot 110 and in another bracket member 121, (see also Figure 15), which is also secured to the boot 110. A holding member 122 is secured on the shaft 119 and is arranged to be engaged by a catch member 123, which is pivoted at 124 on the bracket 120. A spring 125 urges the catch member 123 downwardly into an engaged position, and a plunger 126 operated by a solenoid 127 in a housing 128 is arranged to lift the said catch 123 to release the holding member 122. Two substantially balanced tension springs 129, normally tending to retain the holding member 122 in an upright position are anchored to a cross bar 130 on the outer end of the bracket 120. When a load rests on the scale valve 111 and the catch member 123 is released, said scale valve will swing downwardly and permit the material in the scale hopper to discharge. After said material has all discharged, the counterweights 114 will swing the scale valve 111 upwardly into closed position. As the scale valve 111 approaches the closed position, the catch member 117 engages the lower side of the locking member 118 and raises said locking member into the position shown by dotted lines shown in Figure 3, at the same time tilting the holding member 122 into the dotted line position. When the locking member 118 has reached such dotted line position, it will snap downwardly past the end of the catch member 117, and the holding member 122 will be moved back into engagement with the catch member 123, in which position locking member 118 will be firmly supported, so that the catch member 117 may rest thereon, and the scale valve be supported thereby in a closed position.

When the scale valve 111 closes, it will swing upwardly into the dotted line position shown in Figure 3, and beyond the position in which the catch member 117 rests on the locking member 118, and will be held in this fully closed position by mechanism, shown in Figure 5, until a predetermined weight of material rests on said scale valve and moves the same downwardly into the full line position shown in Figure 3. As shown by full lines in Figure 5, when the scale valve 111 is fully closed, the front edge of said scale valve will rest against an inclined surface 131 on a pawl 132 which is pivoted at 133 and urged toward the scale valve by spring 134, and it will require a predetermined weight on the scale valve to overcome the force of the spring 134 and permit said scale valve to move downwardly into the position shown in broken lines in Figure 5. To prevent the pawl 132 from resisting the closing of the scale valve 111, we provide a stop member 135 which is pivoted on the boot 110 as at 136, and is arranged to engage with said pawl 132. A member 137 is connected by pivot 138 with the stop member 135, and swings downwardly therefrom in a position to be engaged by the edge 113 of the scale valve 111. When the scale valve 111 is moved from the fully closed position shown by full lines in Figure 5, to the occupied position shown by dotted lines in Figure 5, the pawl 132 will be moved outwardly into the dotted line position, and the stop member 135 will drop downwardly until it rests upon a stop pin 139, in which position it will hold the pawl 132 outwardly, clear of the edge of the scale valve, so that when the scale valve again swings upwardly, it will not frictionally engage the pawl 132, but will pass upwardly beyond the end of the pawl 132, will strike the member 137, lift the stop member 135, and release the pawl 132, after the inclined edge of said scale valve is opposite the inclined surface 131, thereby avoiding frictional engagement between the edge of the scale valve 111 and the pawl 132 when the scale valve 111 is being closed. The mechanism shown in Figure 5 is preferably positioned on the side of the scale boot 110, opposite to the mechanism shown in Figure 3.

When the scale valve 111 swings downwardly into the open position and material is discharging from the scale hopper, the weights 114 will be swung upwardly into a position as shown by dotted lines in Fig. 3, which is slightly past a vertical line, passing through the shaft 112, whereby the weight 114 will not tend to close the valve. However, in this position, the weights 114 engage with relatively light springs 140, Fig. 4, which springs exert a light outward pressure on said weights, said pressure being insufficient to start the closing of the valve as long as any material is discharging from the hopper, but being strong enough to move the weights 114 back past the center line as soon as all material has been discharged. Whereupon, the weights 114 will cause the closing of the scale valve. A stop bar 140' is secured to the boot 110 and extends into the path of the lever arms 115 so that the movement of the weights 114 will be stopped after the springs 140 have been flexed enough to give the outward pressure as above set forth.

Baffle member 141 is provided in the scale hopper 22 immediately above the boot 110 to prevent impact of falling material on the scale valve 111, said baffle member allowing the material to freely pass downwardly around the edges thereof.

Referring to Figures 15, 8, and 3, the shaft 119 is journaled at one end in bracket 121, which bracket 121 is secured to boot 110. To shaft 119, pawl 118 and holding member 122 are secured as previously described. A cam 142 is also secured on shaft 119 and is positioned so that its eccentric portion extends upwardly when the holding member 112 is in upright locking position. When this cam 142 is in upright position it engages and lifts a switch plunger 143, which, in turn, engages with an insulated block 144 and lifts a spring contact member 145, thereby making contact with another spring contact member 146. This closes the circuit between electrical conductors 147 and 148, also shown diagrammatically in Figure 1. When the locking member 122 is in the locked position, the conductors 147 and 148 will be electrically connected. For all other positions of the locking member 122, the circuit through these conductors will be broken. It is obvious that this switch mechanism is responsive to the position of the holding and locking means 122, 119 and 118 irrespective of the position of the scale valve, the object of this mechanism being to indicate whether or not the locking mechanism is in locked position, and other means being provided for indicating the position of the scale valve, as hereinafter described.

Switch 149, shown generally in Figure 3 and in detail in Figures 9 and 10, and illustrated diagrammatically by two switches 149' in Figure 1, is mounted on the boot 110.

Referring to Figure 3, the plunger 150 of switch 149 is positioned to be engaged by the edge 113 of the scale valve 111 at a position in the upward travel of the scale valve 111, just previous to the time that the catch member 117 of the scale valve 111 contacts the locking lug 118, the plunger 150 being in its lowermost operative position prior to first being engaged by the edge 113. When the valve 111 is not in engagement with the plunger 150, the valve 111 is therefore in an open position. As the scale valve 111 is closed so that it is in the full line position shown in Figure 3, then the scale valve 111 is closed and a weight of material is present in the scale hopper of at least a predetermined amount, showing that the scale is also occupied. When the scale valve 111 is in the dotted line position, the scale valve is then closed and not occupied. As the scale valve moves upwardly and downwardly it also moves the plunger 150 with it during the part of the travel just described, and the switch 149 electrically indicates such positions in response to such movement of the plunger 150.

In Figures 9 and 10, the plunger 150 is in its most upward travel, thus indicating that the scale is closed and unoccupied. In this position electrical contact is made between conductor 151, flexible conductor 152, brush contactor 153, stud 154, which stud is connected to binding post 155. Conductor 156 connected to binding post 155 is thereby electrically connected to conductor 151, when the scale valve is in this position.

In this uppermost position of the plunger 150, conductor 157 is electrically disconnected from conductor 158, as contactor 159, which is connected by flexible conductor 160 with conductor 157 does not engage stud 161, which stud is electrically connected with conductor 158.

Similarly conductor 162 is electrically disconnected from conductor 163 as the electrical energy traveling along flexible conductor 164 and thence along the double contactor 165 and thence to contactor point 166 cannot reach stud 167 in this position, which stud 167 is electrically connected to conductor 163. For this same position the electrical energy from conductor 162, which has reached double contactor 165, travels along contact point 168, thence through elongated stud 169 to conductor 170, which conductor 170 is electrically connected to elongated stud 169. Also in this same position of the switch, the electrical energy from conductor 162, which has reached double contactor 165, cannot reach conductor 171, as the contact point 168 is not in contact with stud 172, which is connected by conductor 173 with the conductor 171. In summarizing for this position of the plunger 150 and parts connected therewith, electrical contact is established between conductors 151 and 156 and between conductors 162 and 170 and electrical disconnection is established between conductors 157 and 158 and between conductors 162 and 163 and between conductors 162 and 171.

The contactors 153, 159, and 165 are secured to a yoke 174 of insulating material which is secured to the plunger 150 and guided in guide members 175. The plunger 150 is slidably supported in bearings 176 in the switch housing. A helical tension spring 177 urges the yoke 174 and plunger 150 downwardly. A sleeve 178 serves as a stop which engages the switch housing and limits the extent of movement of the plunger 150 in one direction.

When the scale valve 111 is moved downwardly into the full line position shown in Figure 3, then the plunger 150 and yoke 174 are moved downwardly by spring 177 to a mid-position; in which position contactor 159, and contact point 166 of double contactor 165, engage the respective studs 161 and 167, contact point 168 of double contactor 165 remains in contact with elongated stud 169; contactor 153 disengages stud 154; and contactor point 168 of double contactor 165 remains disengaged from stud 172. Summarizing this position of yoke 174 and plunger 150, electrical contact is established between conductors 157 and 158 and between conductors 162 and 163 and between conductors 162 and 170, while electrical disconnection is established between conductors 151 and 156 and between conductors 162 and 171. This position of the contacts represents a position of the scale valve 111 in which said valve is closed and at least a predetermined weight is present thereon. This last described position corresponds to the position shown diagrammatically in Figure 1.

When the scale valve 111 is at a position where the catch member 117 is below the locking lug 118, then the plunger 150 and the yoke 175 are moved to their lowermost position by the spring 177, in which position contact point 168 of double contactor 165 engages stud 172 and all other contacts are electrically disconnected. In this open position of the scale valve in summary, electrical connection is established between conductors 162 and 171 and electrical disconnection is established between conductors 151 and 156 and between conductors 157 and 158 and between conductors 162 and 163 and between conductors 162 and 170.

The scale beam 23, Fig. 2, has the usual weight means 179 near each end and may be provided with a balancing weight 180, of conventional type. A switch 181 preferably of mercury bulb type, is mounted on a pivot 182 near the shorter end of the scale beam 23 and is secured to a bar 183. The bar 183, together with the mercury switch 181, may be turned either into the upright position shown by dotted lines in Fig. 2, or into the horizontal position shown by full lines. When the bar 183 is in the upright position shown by dotted lines, the scale beam will be in balance. A spring 184 is used to retain the bar 183 in this upright position. When the bar 183 is in the horizontal position it rests on a stop pin 185. A weight 186 is provided on bar 183 and adjustable longitudinally thereof. The bar 183 is moved into vertical position before the scale is balanced. After the beam has been balanced, the bar 183 is lowered into horizontal position and the weight 186 adjusted so that it will compensate for the weight of material which has left the bin and is in the air between the bin and the scale hopper immediately after the bin valves have been closed by the weight of material in the scale hopper.

The weight 186 is adjustable to compensate for materials of various weight and for streams of material of various sizes. When the bar 183 is in an upright position, the circuit through this switch 181 is broken, as diagrammatically indicated in Figure 1, and when said bar 183 is in the horizontal position, the circuit through this switch is closed.

Preferably, an extension arm 187 is secured to the balance or longer end of the scale beam 23 and extends outwardly therefrom, and means are provided for exerting a slight upward pressure on this arm only throughout the lower portion of the movement of the balance end of the scale beam. This means for exerting the upward pressure may be in the nature of a lever arm 188 pivoted at 189 and having a tension spring 190 connected with the outer end thereof and exerting a downward pull on said outer end. A stop member 191 limits the tilting movement of the lever arm 188 so that the upward urge of the lever arm is only applied to the scale beam below the center of balance of the scale beam. An electric switch 192, preferably of a mercury tube type, is secured to the lever 188 preferably at the location of the pivot 189. This switch 192 is connected with conductors 193 and 194 and is adapted to establish electrical connection between these two conductors when the scale beam is moved upwardly from its lower position and the lever arm 188 rests on the stop pin 191. When the balance end of the scale beam 23 is in its lowermost position, the circuit through the switch 192 is broken. The balance end of the beam preferably travels in the usual slot 187'.

A plate 195 having a small aperture 196 is connected to the scale beam 23 and may extend in an upward direction. Positioned upon one side of the plate 195 is an enclosed lamp member 197 having a small aperture 198 positioned upon the side of the closure 199 adjacent the plate 195. Positioned upon the other side of the plate 195 is a light responsive cell 200 of a form commonly termed a "photo electric cell" which is enclosed within a housing 201, said housing being provided with an aperture 202. The aperture 202 and the aperture 198 are positioned in a common plane and at a height above the aperture 196 when the scale beam is below its position of balance, but are arranged so that light will pass through all three of these apertures when the scale beam 23 is at or above its position of balance.

In practice, if the end travel of the scale beam is small, the travel of the end of the beam upwardly to a point where the same is no longer affected by the urge of the lever arm 188 may be substantially one fourth of the complete travel of the beam, and the position where sufficient light is communicated from lamp 197 to operate light responsive means 200 may be approximately one half of the remaining distance of the travel of the scale beam, such positions will afford a factor of safety so that in case the scale beam vibrates, such vibration will not affect the operation of the scale. When the light responsive means 200 is acted upon by the lamp 197, electrical connection is established between conductors 203 and 204 by the switch mechanism, not shown, which is actuated by the light responsive means 200 which are connected with said light responsive means 200.

To illuminate lamp 197, (see Figure 1) a transformer 205 is provided. This transformer has a rheostat 206 provided in the secondary to initially adjust the intensity of the light of lamp 197 positioned in closure 199. The operation of the photo electric cell in this device is not governed by the intensity of the light, the rheostat merely constituting means for initially obtaining a satisfactory operating light. The transformer 205 is connected to and obtains its energy from conductors 207 and 208. The energizing of these conductors 207 and 208 is more fully hereinafter described in connection with Figure 1.

The manual control of the scale apparatus, just described, will now be discussed in connection with the wiring diagram shown in Figure 1. This device is not primarily intended for manual control, but it is believed that a discussion of the manual control of the same will render the automatic operation of the same more clear.

For the purpose of establishing a place of beginning for this explanation, it will be assumed that the main bin valve 58, and the dribble bin valve 59 are both in a closed position, and the scale valve 111 is in a closed and locked position. To indicate that the scale valve 111 is in a closed and locked position, a lamp 209 will be illuminated. Tracing the energy illuminating lamp 209, commence with Y energy on conductor 162, and pass through switch 149 and along conductor 170 which is connected with conductor 162 by reason of the position of the scale valve, and then pass along conductors 147 and 148 which are connected by reason of the scale valve being locked, thence along conductor 210, through the lamp 209, to conductor 211, which is connected with source of energy X, thus completing the circuit through the lamp 209, and thereby indicating that the scale valve 111 is closed and locked, and therefore, that the scale is in a position to receive material. As the scale is in a position to receive material, and if it is desirable to manually operate the control means and deliver material to the scale, this may be done by the operation of switch 212. Switch 212 is manually closed, for a desired period, sufficient to permit the thruster, illustrated in Figs. 6 and 7 and hereinbefore described, to completely open the main bin valve 58 and the dribble bin valve 59. In tracing the flow of energy after the switch 212 has been closed, commencing at conductor 162, the Y energy from this conductor 162 will flow along conductors 170, 147, 148, and 210, as just described in connection with the illumination of lamp 209. From a point 213 on conductor 210, the energy will flow along conductor 214 to a point 215, then through the switch 212 to a point 216, then along conductor 217 to valve motor switch 218, for motor 81. The motor switch 218 is a manually operated switch, which will be closed at all times when the scale is in operation, whether the operation be controlled automatically or manually. By the opening of switch 218, the control circuit for the previously described thruster, which operates the bin valves 58 and 59, is completely out of operation, while if said switch 218 is closed, the said circuit is in condition for operation. After passing through switch 218, the energy passes along conductor 220 and through switch 181. Switch 181 is located on the main scale beam 23 and is hereinbefore described, and such switch is preferably operated so that in either manual or automatic control of the main bin valve 58 and the dribble valve 59, the switch 181 must be closed before the thruster may be operated, as the operation of the scale occurs after delivery of material thereto, and the operation may be automatic thereafter. After passing the switch 181, energy flows along conductor 221 through the solenoid 85, and thence to a source of X energy, thus energizing solenoid 85, which will operate the electrical switch 84 and connect the thruster motor 81 to a source of energy 83.

The operation of the thruster motor 81 will then open the main bin valve 58 and the dribble bin valve 59, and permit material to flow from the bin 20 into the scale hopper 22. The switch 212 is manually closed for the desired period, as before stated, and when the circuit through this switch is broken, the operation of the thruster motor 81 will be discontinued. When the energy is discontinued to the thruster motor 81, the thruster piston 77, together with parts 75, 74, 73, 70, 68, and 64 will return to normal position by gravity and will not thereafter interfere with the gravity closing of said valves.

When switch 212 is closed, both the main bin valve 58 and the dribble bin valve 59 will be moved to an open position by the action of the thruster and will be held in this open position by the hooks 95 and 87, respectively, as previously described. When the dribble bin valve 59 is open, the lamp 222 will be illuminated, indicating the open position of such dribble bin valve. In the event the main bin valve 58 and the dribble bin valve 59 are not completely opened before the circuit to the thruster motor 81 is broken, said bin valves will drop back to the closed position and will operate the switch 103 and display the closed signal by illuminating lamp 223, thus indicating to the operator that he has failed to hold the switch 212 closed for a sufficiently long period of time, to complete the opening of the bin valves, and he can again close the switch 212 for the desired period. Tracing the circuit energizing lamp 223, commence with Y energy on conductor 106 and pass through switch 103 and along conductor 108, through lamp 223 and along conductor 211 to a source of X energy.

The opening of the main bin valve 58 and dribble bin valve 59 permits the spring contactor 105 of switch 103, (see Fig. 11) to be moved by its own spring action to break the just described signal circuit to lamp 223, through conductors 106 and 108, and to close another circuit through conductors 106 and 107 of said switch 103. This last closed circuit is traced as follows; commencing with Y energy on conductor 106, through the switch 103, along conductor 107, through the lamp 222, and then along conductor 211 to a source of X energy, thus illuminating lamp 222, thereby indicating an open position of one or both of the bin valves.

It will be noted that the illuminating of signal lamp 209 above described, is produced by the closing and locking of the scale valve 111, which closes the circuit through the conductors 162, 170, 147, and 148, and that the energy to operate the solenoid 85 controlling the thruster motor 81 must pass through these same conductors. Therefore, the scale valve 111 must be closed and locked before the bin valves 58 and 59 can be opened to admit material to the scale hopper 22, thus insuring that any material delivered from the bin 20 will be retained in the scale for weighing, and cannot pass directly through the scale.

The bin valves 58 and 59 may be closed by manual control without unloading the scale, by closing the double-pole switch 224. When this is done, Y energy from main control switch 48 will flow along conductor 225, through both sets of contacts of switch 224, and along conductors 226 and 227 respectively, through the dribble valve release solenoid 92 and the main valve release solenoid 100 and thereafter to sources of X energy. The plungers 91 and 99 of solenoids 92 and 100, respectively, are connected as previously described with the hooks 87 and 95, respectively, which are adapted to hold the dribble bin valve 59 and the main bin valve 58 in open position. The energizing of these solenoids releases the said hooks and permits both of the bin valves 59 and 58 to close by gravity.

As the dribble bin valve 59 opens it will illuminate the lamp 222 by the operation of the indicator switch 103 as previously described, and as the dribble bin valve 59 closes, it will illuminate lamp 223. Due to the fact that the dribble bin valve closes the last part of the discharge opening from the bin 20, the indicator switch 103 is operated by the dribble bin valve 59, thus indicating the complete shut off of the flow of material from the bin. As both the dribble bin valve 59 and the main bin valve 58 open together, the valve indicator switch 103, if it is operated by the dribble bin valve 59, will at all times indicate the open position for both of these bin valves. In scales which are not designed to weigh large quantities of material in a short period of time and which do not, therefore, need to restrict the opening towards the last part of the weighing, from the bin to the hopper of the scale, only one valve may be used, and the dribble bin valve 59 may be eliminated. In such scales the valve indicator switch 103 may be operated by the single bin valve to indicate both the open and closed position.

Thus the bin valves 58 and 59 may be manually controlled to either open or close them any time to deliver material to the scale hopper 22 to be weighed, provided that the scale valve 111 is closed and locked, and the scale hopper 22 is otherwise in proper condition to receive such material. The automatic control of the bin valves 58 and 59 will be described hereinafter.

When the bin valves 58 and 59 are opened and the material allowed to fall into the scale hopper 22, it first strikes baffle plate 141 and is thereby deflected so that the impact of the falling material is borne by the baffle plate and does not affect the scale valve 111, and so that the scale valve 111 is only affected by the weight of the material which flows around the baffle plates onto said scale valve. Operatively connected with the scale valve 111, as hereinbefore described, is a scale valve indicator switch 149, which scale valve indicator switch 149 is actuated by a predetermined weight of material upon the scale valve so that conductors 151 and 156 are electrically disconnected, conductors 158 and 157 and conductors 162 and 163 are respectively connected when the scale valve is closed and at least the minimum predetermined weight rests upon the scale valve 111. When no weight rests upon the scale valve 111 and the same is closed, the conductors 151 and 156 will be electrically connected, and the conductors 158 and 157 and the conductors 162 and 163 wil be electrically disconnected, respectively.

Thus, as material is delivered to the scale, the conductors 162 and 163 are electrically connected, and Y energy from conductor 162 travels along conductor 163 through lamp 228, and along conductor 211 to a source of X energy, thus illuminating the lamp 228, thereby indicating to the operator that material of at least the predetermined minimum amount necessary to move the scale valve 111 to the occupied position is present in the scale.

If the automatic control of the scale in closing the bin valves 58 and 59 should not be operating, or if the operator fails to turn off the supply of material from the bin to the scale hopper by the operation of switch 224, which was previously described, or should fail to close the manual dump switch 229, which will first close the bin valves 58 and 59 as is hereinafter described, then the material will rise in the scale hopper until a pressure will be exerted upon the diaphragm 35 of the pressure responsive device 34, thereby cutting off the supply of material to the scale hopper. This safety cut off is accomplished by movement of the diaphragm 35 of the scale pressure responsive device 34 which is operatively connected with the switch mechanism of said scale pressure responsive device 34. As the material exerts a pressure upon the diaphragm 35, plunger 36 of the scale pressure responsive device 34 will be moved, and will move the plunger 39 of the switch 40, thereby electrically disconnecting conductors 56 and 53 and electrically connecting conductors 53 and 54 and conductors 53 and 55, respectively. When conductors 53 and 56 are electrically connected, as they ordinarily will be, Y energy from conductor 53 passes through switch 40, thence along conductor 56, thence along conductor 230, through lamp 231, and along conductor 211 to a source of X energy, and thereby illuminates lamp 231, which indicates that the level of the material (if any) in the scale hopper is below the scale switch 40. If the conductors 53 and 56 are electrically disconnected and the conductors 53 and 54 and conductors 53 and 55 are respectively connected by the operation of the scale switch 40, then the lamp 231 will be dark and Y energy from conductor 53 will pass along conductors 54 and 55, respectively, to points 232 and 233, respectively, and thence along conductors 226 and 227, respectively, through the respective solenoids 92 and 100, controlling the dribble bin valve release and main bin valve release respectively, and to a source of energy X, thus releasing the dribble bin valve 59 and the main bin valve 58, and preventing the delivery of any further material from the bin 20 to the scale hopper 22. The scale switch 40 is designed as a safety feature and is positioned in the upper part of the scale hopper at a point above the normal capacity level of the scale hopper.

Before any material is introduced into the scale hopper, the usual weights are placed upon the scale beam 23 so that the beam is set to balance at any predetermined weight in the scale hopper. As the material is delivered from the bin 20 to the scale hopper 22 the balance end of the scale beam will rise and the operator may close switch 224, thus releasing the main bin valve 58, and the dribble bin valve 59, and preventing the introduction of further material into the scale hopper. Then switch 181 is turned to the upright position as indicated by dotted lines in Fig. 2. In this position the scale beam is at balance before any material is introduced into the scale hopper. In this position no compensation is made for the material in the air between the bin and the scale hopper after the scale beam rises. Thereafter it will be necessary for the operator to adjust the usual weights on the scale beam 23 until the scale beam comes to a balance, and he will be able to thereby weigh the material in the hopper in the usual manner.

To manually control the opening of the scale valve 111 and to thereby remove the weighed material from the scale, after the bin valves have been closed and the scale beam has been brought to balance in the weighing position, as above described, the double-pole manually operated dump switch 229 is closed. Upon the closing of said switch 229, two bin valve release circuits to solenoids 92 and 100 will be closed, however, as it has been assumed that the bin valves are already closed, due to the closing of switch 224, these circuits, for the present, will be disregarded. When the switch 229 is closed, Y energy from main switch 48 will flow along conductor 225 to a point 234, thence through terminals 235 of dump switch 229, thence along conductors 236, and 193, through contactor switch 192 and along conductor 194 to point 237, thence along conductor 238, through solenoid 239, thence along conductor 240 and through the contacts 241 of photoelectric switch 242, which are closed by reason of the scale beam 23 being up, thence along conductor 207 to a source of X energy, thus energizing solenoid 239, connecting conductor 240 to a source of X energy, and connecting conductor 243 to conductor 238. Due to a tendency of the scale beam to vibrate when it is up and thus interrupt the circuit through the photoelectric control, the double pole relay switch 239 is provided for connecting conductor 240 with a source of energy X, and conductor 243 with conductor 238, when the solenoid 239 is energized as just described.

After the solenoid 239 has been energized by X energy supplied by conductor 240, then conductor 240 will be connected to a separate source of X energy, and solenoid 239 will remain closed as long as Y energy is supplied to conductor 238. The provision of this additional energizing means for the solenoid 239 is of greater utility in connection with the fully automatic control of the scale hereinafter described, than it is in connection with the hand control, due to the fact that the operator can wait until the scale beam 23 is at rest before closing the dump switch 229 when the hand control is used. When the automatic control is used, the operation of cell 200 electrically connects conductors 203 and 204, thereby operating solenoid 242 and furnishing X energy to conductor 240 through contacts 241, and after X energy has been initially provided to conductor 240, then by the operation of solenoid 239, X energy will be furnished from a separate source to conductor 240, and thereafter such X energy will not be interrupted by vibration of the scale beam. Upon the closing of the circuit through conductors 238 and 243, Y energy from conductor 238 flows along conductor 243 and through the solenoid 244 to a source of energy X, thus closing the tally relay switch 245. With the bin valves already closed and manual control dump switch 229 closed, Y energy from conductor 106 flows to conductor 108, thence along conductor 108 to point 246, thence along conductor 247 and 248, and through the then closed tally relay switch 245, connecting conductor 248 with conductor 249, thence along conductors 249 and 250, through the switch 229, thereby connecting to conductor 251, thence along conductor 157 and through switch 149 to conductor 158, and through scale valve release solenoid 127 to a source of energy X, thereby energizing this solenoid 127 which releases the catch member 123 and allows the scale valve 111 to open by reason of the weight of material resting upon it.

At the same time Y energy on conductor 158 travels along conductor 252 to point 253, thence through the solenoid 254 of recorder 255, thence along conductor 256 to a source of X energy at the main switch 48, thereby operating the recorder 255 and stamping a record on a tape 257, recording information relative to the dumping of the scale hopper 22. The recorder 255 may embody motor driven feeding mechanism 258 for the tape 257, and preferably an electrically controlled time indicating mechanism 259, whereby a time record of the dumping of the scale will be made. The time recorder 259 is energized through suitable conductors 260. At this same time, Y energy from point 253 travels along conductor 261 through a solenoid 262 and along conductor 211 to a source of X energy, thus energizing solenoid 262 and operating a tally 263 which registers each time the scale is dumped.

In the preceding description in the operation of dump switch 229, it has been assumed that the bin valves 58 and 59 were both closed by operation of the switch 224 before the dump switch 229 was closed. However, if the dump switch 229 is manually closed while the bin valves are open, and when the scale beam is not in balance, no circuits are completed, and therefore, no operation is produced. However, if the scale beam is in balance, then upon the closing of the dump switch 229, circuits will be completed as follows: Y energy from the main switch 48 will travel along conductor 225 to point 234, thence through contact points 235 of dump switch 229, thence along conductors 236 and 193, through beam switch 192, which will be closed by reason of the balance end of the scale beam being elevated, thence along conductor 194 to a point 237, thence through the solenoid of relay 264 to a source of X energy. This energizes the solenoid of relay 264, which closes the contacts of said relay, permitting Y energy to travel along conductor 265, thence along conductor 55 to a point 233, thence along conductor 227, thence through solenoid 100 to a source of energy X. This energizing of solenoid 100 releases the main bin valve 58 and permits it to close by gravity. As the scale beam 23 is in balance, the previously described circuit completed by the photoelectric control means, energizes solenoid 239 and electrically connects conductors 238 and 243. This permits Y energy from conductor 238 to pass to conductor 243, thence through solenoid 244 to source of energy X. Energizing of solenoid 244 permits Y energy to flow along conductors 266 and 267, thence along conductor 54 to point 232, thence along conductor 226 and through solenoid 92 to source of energy X, which solenoid 92 releases dribble bin valve 59 and permits it to close by gravity. With the bin valves both closed, the operation of the control circuits to dump the scale is as previously described.

In connection with the dumping of the scale hopper 22 it should be noted that the supply of material to the scale hopper 22 must be first stopped before the hopper may be emptied, thereby insuring that the material will not pass directly through the scale. Also, it should be noted that the scale beam must be up before the scale hopper 22 may be emptied, thus insuring that the material in the scale has been weighed. The weight of the material discharging through the scale valve keeps the scale valve open until the scale hopper is empty. As soon as the material is all discharged, the springs 140 and counter-weight 114 will raise the scale valve into fully closed position and it will be retained there by the scale valve catch mechanism previously described. By the operation of the scale valve indicator 149 which is connected to the scale valve as previously described, conductor 162 is connected with conductor 171 when the scale valve is open and conductor 162 is connected with conductor 170, when the scale valve is closed. The lock switch connected to plunger 143 is operatively connected to the catch mechanism of the scale valve 111, and the circuit through conductors 147 and 148 of said switch will be closed when the scale valve lock mechanism is in a locking position and said conductors 147 and 148 will be electrically disconnected at all other times, such operation of the lock switch has been previously described. As conductor 162 is connected to conductor 170 by the closing of the scale valve and the circuit through the lock switch connected with the plunger 143 has been closed by the locking of the scale valve in this position, energy Y from conductor 162 will pass to conductor 170, and thence to conductor 147, thence to conductor 148, thence along conductor 210 and thence through lamp 209 and along conductor 211 to a source of energy X, thereby illuminating lamp 209. The illumination of lamp 209 indicates that the scale valve 111 is in a closed and locked position and therefore is again in a position to receive further material for weighing.

In the previous described circuit, lamp 209 was illuminated when the scale valve 111 was locked and closed. Lamp 285 is illuminated when the scale valve 111 is open in the following manner. When the scale valve 111 is open, scale valve indicator switch 149 operated by such valve, closes an electrical circuit between conductors 162 and 171 and thence along conductor 171 to a point 280, thence along conductor 286 through lamp 285 along conductor 211 to a source of X energy, thereby illuminating lamp 285.

The bin 20 is provided with a bin pressure responsive means 34, which means is devised as a safety feature. This means 34 is operated by and may be used to indicate the presence of excess material in the bin. As hereinafter set forth, the bin pressure responsive means 34 will indicate by a signal, as a lamp 268, that the supply of material in the bin is below the means 34, or by another signal as by the sounding of a horn 269, the presence of material at or above the means 34 will be indicated. In most instances the size of the bin is sufficient so that the indicating method herein set forth is satisfactory. The circuits operating this device are as follows: Diaphragm 35 in bin pressure responsive means 34 is connected to a plunger 36, which, in turn is connected with the plunger 37 of electric switch 38 (see Fig. 13). When the diaphragm 35 is not subjected to pressure, electrical contact is established between conductors 41 and 43 and when pressure is exerted upon the diaphragm 35 of the bin pressure responsive means, connection between conductors 41 and 43 is broken and an electrical connection is made between conductors 41 and 42 of said switch 38. When electrical connection is made between conductors 41 and 42 of said switch 38, Y energy passes to horn signal 269 and thence to a source of X energy, indicating that a pressure has been exerted upon the diaphragm 35 and that the level of the material in the bin has reached the bin pressure responsive means 34. When no pressure is exerted against the diaphragm 35 in the pressure responsive means 34, the conductors 41 and 43 are electrically connected and energy from Y passes along these conductors and through lamp 268 and along conductor 211 to a source of X energy, thus indicating by the illumination of lamp 268 that a safe level of material, if any, exists in the bin.

We have set forth a manner in which the scale may be manually controlled, both in the filling, balancing and delivery of the material from the scale. Such features are useful or the purpose of checking any part of the automatic operation of the scale, which will now be described, and are useful in the event of a breakdown in any part of the automatic apparatus.

The signal lamps which have been described in connection with the manual control of the scale will be illuminated and indicate the same conditions when the scale is under automatic control.

For the automatic and normal control of this weighing apparatus, the double-pole manually operated automatic weight switch 270 and the manually operated automatic dump switch 271 are closed, and the hand switch 181 on the scale beam is placed in position for automatic weighing, that is the position shown in full lines in Fig. 2. To insure that the weight 186 is in proper position for the automatic control of the apparatus and to thereby insure that a weight is on the scale beam to compensate for the stream of material released from the bin 20, but not yet delivered to hopper 22, the contactor switch 181 must be in the position shown in full lines in Fig. 2 before the scale valves may be opened to deliver material to the hopper.

After the scale beam has been balanced as previously described in connection with the scale beam proper, the desired additional weights may be applied, so that a desired weight in the hopper will cause the scale beam to balance.

With the scale beam in this position, the scale may be automatically operated as follows:

To establish a point of beginning in describing one cycle of the automatic operation of this scale, it will be assumed that the scale valve 111 is in a locked and closed position, and that the main bin valve 58 and the dribble bin valve 59 are in a closed position. Switches 48, 270, and 271 are then closed, and switch 181 must be turned into the position shown in full lines in Fig. 2. With the apparatus in this condition, then the main bin valve 58 and the dribble bin valve 59 will open. The electrical circuits opening these valves are as follows:

Y energy on conductor 162 will be connected to conductor 170 and to 147 and to 148 by the position of switch 149 and plunger 143, because it was assumed that the scale valve 111 was in a locked and closed position. The Y energy from conductor 162 will continue along conductor 210 to a point 213, thence along conductor 214 to manually operated automatic weigh switch 270, and thence to conductor 156, through switch 149 to conductor 151, thence through point 216, along conductor 217, through motor switch 218 along conductor 220, through contactor switch 181, along conductor 221, to solenoid 85 to a source of X energy. The energizing of solenoid 85 closes contactor 84, which connects electric motor 81 with source of energy 83 through conductors 82. The energizing of electric motor 81 operates the thruster mechanism, thus opening main bin valve 58 and dribble bin valve 59, which valves will latch and remain in open position.

As material is admitted into hopper 22, a predetermined weight, resting upon scale valve 111, will cause this valve to move from the empty position, as shown in dotted lines in Fig. 3, to the occupied position as shown in full lines in Fig. 3. This change of position will operate switch 149, as previously described, in connection with Figures 9 and 10. This operation of switch 149 will cause electrical disconnection between conductors 151 and 156, which disconnection will interrupt the electrical circuit to solenoid 85, and in turn the circuit to electric motor 81, thus allowing the thruster mechanism to return to the normal position by gravity, leaving the main bin valve 58 and the dribble bin valve 59 latched open, but free to fall by gravity to a closed position, in the event that the catch mechanism thereof is released.

As material accumulates in the hopper 22 a force tending to lift the balance end of the scale beam 23 is exerted by said material and another force tending to lift the balance end of the scale beam is exerted by the spring 190 acting through the switch lever 188 and beam extension 187, the switch lever 188 being pivoted at 189. The force of this spring 190 is exerted on the balance end of the scale beam during the period when said balance end is in a lowered position and throughout the lower portion of the arc of distance through which said balance end moves but in the central and upper portion of its arc or zone of movement, the scale beam is not subject to the force of the spring 190 due to the fact that as the balance end of the scale beam moves upwardly, the switch lever 188 comes to rest on a stop 191 and the balance end of the scale beam continues its upward movement without any further upward force being exerted thereon by the switch lever 188.

As the weight of the material entering the scale hopper nears the predetermined amount necessary to balance the beam for which the scale beam weights have been previously adjusted, the combined weight of the material and the upward urge of the switch lever 188 will elevate the balance end of the scale beam until the switch lever is stopped by the stop member 191. This movement of the switch lever 188 will cause contact between the terminals of contactor switch 192, which terminals are connected with conductors 193 and 194.

This closes a circuit releasing the main bin valve catch 95 and permits the main bin valve 58 to close and leaves the dribble bin valve 59 open. This circuit may be traced as follows: Y energy from the main switch 48 flows along conductor 225 to point 272, thence through the lower contacts of automatic weigh switch 270 to a point 273, thence along conductor 236 and conductor 193 through the contacts of the contactor switch 192 which is closed as previously described, thence along conductor 194 to a point 237, thence through the relay solenoid 264 and thence to a source of X energy. It will be noted that the automatic circuit just described operates the relay connected with solenoid 264 in a similar manner as previously described in the operation of the manual control dump switch 229, except that in the said automatic circuit the lower contacts of the manually operated automatic weigh switch 270 are always closed during automatic operation and the connection of the contacts of the contactor switch 192 completes the circuit when the balance end of the scale beam rises sufficiently to permit closing of the contactor switch 192. When the manual control is used, there are two switches in the circuit, namely contactor switch 192 and the lower contacts of dump switch 229, both of which may be open and connections must be made between said contacts of both of these switches before the main bin valve release can be operated. The operation of relay solenoid 264 through the automatic switch 270 releases the main bin valve in the same manner as described in connection with the manual control of relay solenoid 264 by switch 229.

The release of the main bin valve 58 as above described checks the main flow of material, but leaves the dribble bin valve 59 still open thereby permitting a diminished supply or dribble stream to continue to flow through the opening 63 in the main valve into the scale hopper.

The automatic closing of the dribble bin valve 59 thereafter discontinues the flow of the dribble stream when the desired amount of material has been discharged from the bin and has raised the scale beam through the central portion of its arc. This is controlled by the operation of the photoelectric control means. Tracing this circuit, Y energy from main switch 48 flows along conductor 225 to point 272, thence through auto weigh switch 270 to a point 273, thence along conductor 236, thence along conductor 193, thence through contactor switch 192, thence along conductors 194 and 238, thence through the solenoid 239, thence along conductor 240 and through the closed contacts 241 of the photo electric control to a source of X energy. The contacts 241 are electrically connected by the upward movement of the balance end of the scale beam produced by the addition of more weight in the hopper. As the scale beam approaches the upward limit of its movement, light passes through the apertures 198, 196 and 202, thereby actuating the light responsive cell 200 and causing electrical connection between the conductors 203 and 204, thus energizing relay 242 and closing the circuit through contacts 241. After the solenoid 239 has been energized, a separate source of X energy passes to conductor 240, keeping the solenoid 239 energized as long as Y energy is supplied to conductor 238, regardless of the intermittent operation which may occur between contacts 241 in the photo electric control. With solenoid 239 energized, Y energy traveling along conductor 238 passes to conductor 243 through the solenoid 244 to a source of X energy, thus energizing solenoid 244 and allowing Y energy to pass through tally relay switch 265 to a point 266, thence along conductor 267 to a point 232, thence along conductor 226 through the dribble valve release solenoid 92 and to a source of X energy, thereby operating the solenoid 92 of the dribble valve release and operating the catch mechanism 87 of the dribble valve release, permitting the dribble valve 59 to close by gravity. It will be noted that the balance end of the scale beam 23 has passed the center of the balance part of its arc and that an amount of material has been released, which has not yet reached the scale hopper. The weight 186 has been adjusted so that this weight, when in the position shown in full lines in Fig. 2 is sufficient to compensate for the weight of such material. If the manually operated automatic dump switch 271 has not yet been closed, and the switch 181 is turned to the position shown by dotted lines in Fig. 2, the scale may be checked for accuracy.

As soon as the dribble valve has closed, the valve indicator switch 103 will be thereby operated and conductors 106 and 108 will be electrically connected, permitting Y energy from 106 to flow along conductor 108 to a point 246, thence along conductors 247 and 248, and thence through relay switch 245, which relay switch 245 is closed, as the scale beam is up. Y energy from conductor 248 will then pass along conductor 249 to a point 274, and thence through scale dump release relay switch 275. The contacts of this scale dump release relay switch 275 are closed as the scale switch 40, connected with plunger 39, indicates a safe load in the scale, thereby electrically connecting the Y energy on conductor 53 to conductor 56, thence through the solenoid of relay 275 to a source of X energy, thereby energizing the relay 275 and closing the contact points thereof. Y energy continues along conductor 276, through auto dump switch 271, which was closed upon commencement of automatic operation of the scale. Thence along conductor 277 to a point 278, thence along conductor 157 through switch 149 to conductor 158, thence through the solenoid 127 of the valve release mechanism and to a source of X energy, thus energizing valve release solenoid 127 and releasing the catch 123 and permitting the scale valve 111 to open because of the weight of material resting upon such scale valve. It will be noted that before the scale valve 111 can be opened, the scale must be occupied with a weight of material at least equal to the minimum amount required to move the switch 149 to the occupied position; that the scale is not overfull, thereby operating dump release relay switch 275 through scale switch 40 attached to plunger 39; that the scale beam must be up because of weight of material in the scale hopper so that the switch 245 has been operated; and the bin valve switch 103 must indicate that the bin valves 58 and 59 are closed, showing that the supply of material from the bin to the scale has been cut off. Requiring such a series of operations before the scale valve can be opened, insures that any material in the scale will be weighed before delivering the material from the scale.

The material will continue to flow through the scale valve from the scale hopper to a desired place, as to a chute indicated by 279, until the scale hopper is empty. When the scale hopper is empty, the scale valve 111 will close, due to the action of counterweights 114 and spring 100. As the scale valve 111 is closed, it will be locked in closed position by locking lug 118 and parts connected therewith. Then the conductors 162 and 170 will be connected, and conductors 162 and 171 will be disconnected, all of said conductors being operated by switch 149. The locking operation of scale valve 111 will connect conductors 147 and 148 and Y energy will flow from conductor 162 along conductors 170, 147, 148, 210 to a point 213, along conductor 214, through manually operated automatic weigh switch 270, along conductor 156 through switch 149 to conductor 151. Conductors 156 and 151 will be connected, as no material is present in the scale. The Y energy will continue to flow along conductor 151, thence along conductor 217, through motor switch 218, along conductor 220, through the contact switch 181, along conductor 221, through solenoid 85, and thence to a source of X energy, thus operating the switch 84, and thereby energizing electric motor 81 of the thruster mechanism, as previously described. As soon as the predetermined weight is delivered to the scale hopper, the indicator switch 149 will be operated, and the connection between conductors 156 and 151 will be broken, thereby discontinuing the operation of the thruster mechanism and permitting the same to return to normal position. It is to be noted that a certain time delay is provided after the electric motor 81 of the thruster mechanism commences operation before the circuit to such motor is broken by the operation of indicator switch 149. Such delay is desirable, as it permits sufficient time for the thruster mechanism to fully open the bin valves 58 and 59 and permit said valves to be secured in open position by their respective catch means 95 and 87. Thereafter, the automatic cycle of operations will follow so long as material is present in the bin 20 and the previously described switches in the circuit are not opened or disturbed.

As an additional protective means whenever the conductors 162 and 171 are electrically connected by the switch 149 due to the scale valve 111 being open Y energy on conductor 162 will travel along conductor 171 to a point 280 through the solenoid relay 281 to a source of X energy, thus energizing the solenoid relay 281 and permitting Y energy from point 282 to flow to conductors 54 and 55 and thence to points 232 and 233 respectively, thence along conductors 226 and 227 respectively, through solenoid 92 and solenoid 100 to a source of X energy, thereby releasing the dribble valve hook 87 and the main valve hook 95. By this means, an additional circuit is provided to insure that at all times the scale valve 111 is open; the bin valves are closed.

Solenoid relay 283 is provided as a safety measure to prevent duplicate registration on the tally 263, or a duplicate record on the time recorder 255, should Y energy from 106 be momentarily interrupted by a rebound of dribble bin valve 59. The operation is as follows: Y energy from 106 passes along conductor 108 to point 246, thence along conductor 247 to point 284, thence through solenoid relay 283, thence to a source of X energy. The operation of solenoid relay 283 permits Y energy to flow from point 266 through the contacts of solenoid relay 283 to conductor 247, thus insuring that conductor 247 will be energized with Y energy even though Y energy from 106 may be momentarily interrupted by a rebound of dribble bin valve 59.

Obviously, changes may be made in the forms, dimensions and arrangement of the parts of our invention, without departing from the principle thereof, the above setting forth only preferred forms of embodiment.

We claim:

1. In a scale, a scale hopper, a scale valve for said hopper, securing means for said valve, electrically controlled releasing means for said securing means, light responsive electrical switch means, an electrical circuit for said releasing means including therein electrical connection established by the operation of said light responsive electrical switch means, a source of light operatively positioned as respects the balanced position of a movable scale beam means and as respects said light responsive electrical switch means, and a movable scale beam means operatively connected with said hopper and movable into and out of the path of light to said light responsive electrical switch means, whereby the operation of said scale valve may be determined by the balanced position of said movable scale beam means without interference with the free movement of said scale beam.

2. In a scale, a scale hopper, a scale valve for said hopper, electric switch means operated by the opening and closing of said scale valve, supply means for said scale hopper, an electrically releasable hinged valve member for said supply means, and an electrical circuit for releasing said supply valve member including therein electrical connection established by the operation of said electric switch means, whereby the position of said supply valve means may be predetermined by the position of said scale valve means.

3. In a scale, a scale hopper, a scale valve for said hopper, locking means for said scale valve, electric switch means operated by the opening and closing of said scale valve, other electric switch means operated by the locking and unlocking of said scale valve, supply means for said scale hopper, valve means for said supply means, electrically actuated operating devices for said supply valve means, electrical circuit means for said electrically actuated operating devices including therein electrical connection established by the operation of said two electric switch means, whereby said supply valve means can only be actuated when said scale valve and said scale valve locking means are in predetermined positions.

4. In a scale, a scale hopper, supply means for said hopper, a plurality of electrically controlled valves for said supply means, light responsive electrical switch means, a source of light for said light responsive electrical switch means, movable scale beam means operatively connected to said scale hopper and movable into and out of the path of light to said light responsive switch means, other electrical switch means operated by said movable scale beam means, an electrical circuit for certain of said supply valve means including therein electrical connection established by the operation of said light responsive electrical switch means, and an electrical circuit for other of said supply valve means including therein electrical connection established by the operation of said other electrical switch means.

5. In a scale, a scale hopper; an electrically controlled valve for said hopper; electric switch means, establishing a plurality of electrical connections, operated by said hopper valve; a supply means; an electrically controlled valve for said supply means; electric switch means, establishing a plurality of electrical connections, operated by said supply valve; a scale balance beam operatively connected to said scale hopper; electric switch means, establishing a plurality of electrical connections, operated by predetermined positions of said scale balance beam; an electrical operating circuit for said hopper valve including therein an electrical connection established by the operation of said supply valve electric switch and by said electrical switch means operated by the balance beams; and an electrical operating circuit for said supply valve including therein electrical connection established by the operation of said electrical switch means operated by the balance beam and by the electrical switch means operated by the hopper valve, whereby the relative positions and sequence of operation of the supply valve, the hopper valve and the balance beam may be predetermined.

6. In a scale, a scale hopper; an electrically controlled valve for said hopper; electric switch means, establishing a plurality of electrical connections, operated by said hopper valve; a supply means; an electrically controlled valve for said supply means; electric switch means, establishing a plurality of electrical connections, operated by said supply valve; a scale balance beam operatively connected to said scale hopper; light responsive electrical switch means; a source of light for said light responsive electrical switch means; scale beam means operatively connected with said hopper and movable into and out of the path of light to said light responsive switch means; an electrical operating circuit for said hopper valve including therein an electrical connection established by the operation of said light responsive electrical switch means and by said electrical switch means operated by the supply valve; and an electrical operating circuit for said supply valve including therein electrical connection established by the operation of said light responsive electrical switch means and by the electrical switch means operated by the hopper valve, whereby the relative positions and sequence of operation of the supply valve, the hopper valve and the balance beam may be predetermined.

7. In a scale, a scale hopper, a valve for said scale hopper, actuated through a limited movement by a predetermined minimum weight of material thereon while remaining in a closed position, supply means for said hopper, valve means for said supply means, electrically controlled opening devices for said supply valve means, electrical switch means operated by said limited movement of said scale valve, and an electric circuit for said supply valve opening devices including therein electrical connection established by the operation of the said electrical switch means, whereby the operation of said opening devices may be determined by the position of said scale valve within the range of said limited movement.

8. In a scale, a scale hopper, supply means for said hopper, valve means for said supply means, electrically controlled opening devices for said valve means, a scale beam operatively connected to said hopper, movable compensating weight means operatively connected to said scale beam and movable into and out of compensating position, electrical switch means closed by said compensating weight means when said weight means is in compensating position, and an electrical circuit for said opening devices including therein an electrical connection established by the closing of said switch means.

9. In a scale, a scale hopper; supply means for said hopper; valve means for said supply means; an electrically controlled opening device for said valve means; electrically controlled closing means for said valve means; a movable scale beam operatively connected to said scale hopper; electrical switch means operated by a predetermined position of said movable scale beam; an electrical circuit for said valve closing means, including therein electrical connection established by the operation of said scale beam switch means; a compensating weight means, for material delivered to the hopper after the operation of said scale beam switch means, operatively connected to said scale beam and movable into and out of compensating position; an electrical switch means operated by the said movement of said compensating weight; and an electrical circuit for said supply valve opening device, including therein an electrical connection established by the operation of said compensating switch, whereby the said supply valve opening device may be actuated only upon a predetermined position of said compensating weight.

10. In a scale, a scale hopper, an electrically operated movable valve for said hopper, a supply means, an electrically operated movable valve for said supply means, pressure responsive means positioned above the normal operating level in said hopper, an electrical switch establishing a plurality of electrical connections operated by said pressure responsive means, an electrical circuit for said movable supply valve including therein an electrical connection established by the operation of said pressure responsive electrical switch means, and an electrical circuit for said movable hopper valve including therein an electrical connection established by the operation of said pressure responsive means, whereby the positions of said hopper valve and said supply valve may be determined by an abnormal level of material in said hopper.

11. In a scale, a scale hopper; an electrically controlled valve for said hopper; a supply means; operating means for said supply means; electric switch means, establishing a plurality of electrical connections, operated by said operating means for said supply means; a scale balance beam operatively connected to said scale hopper; electric switch means operatively connected to said scale balance beam; and an electrical operating circuit for said hopper valve, including therein an electrical connection established by the operation of said balance beam electrical switch means and by said electric switch means operated by the operating means for said supply means, whereby the position of the hopper valve may be predetermined by the position of said balance beam and said operating means for the supply means.

12. In a scale, a scale hopper; a valve for said scale hopper, actuated through a limited movement by a predetermined minimum weight of material thereon while remaining in a closed position; supply means for said hopper; electrically controlled operating devices for said supply means; electrical switch means operated by said limited movement of said scale valve; and an electric circuit for said electrically controlled operating devices for said supply means, including therein electrical connection established by the operation of the said electrical switch means, whereby the operation of said electrically controlled operating devices for said supply means may be determined by the position of said scale valve within the range of said limited movement.

13. In a scale, a scale hopper; supply means for said hopper; electrically controlled operating means for said supply means; a scale beam operatively connected to said hopper; movable compensating weight means operatively connected to said scale beam and movable into and out of compensating position; electrical switch means operated by the movement of said compensating weight into and out of compensating position; and an electrical circuit for said electrically controlled operating means for said supply means including therein an electrical connection established by the operation of said electrical switch means operated by the movement of the compensating weight into and out of compensating position.

14. In a scale, a scale hopper; a supply means; an electrically controlled operating means for said supply means; pressure responsive means positioned above the normal operating level in said hopper; an electrical switch establishing a plurality of electrical connections operated by said pressure responsive means; and an electrical circuit for said electrically controlled operating means for said supply means including therein an electrical connection established by the operation of said pressure responsive electrical switch means.

15. In a scale, a scale hopper; an electrically operated movable valve for said hopper; a supply means; an electrically controlled operating means for said supply means; pressure responsive means positioned above the normal operating level in said hopper; an electrical switch establishing a plurality of electrical connections operated by said pressure responsive means; an electrical circuit for said electrically controlled operating means for said supply means including therein an electrical connection established by the operation of said pressure responsive electrical switch means; and an electrical circuit for said movable hopper valve including therein an electrical connection established by the operation of said pressure responsive means, whereby the position of said hopper valve and the operation of said electrically controlled operating means for said supply means may be determined by an abnormal level of material in said hopper.

16. In a scale, a scale hopper; an electrically controlled valve for said hopper; a supply means; operating means for said supply means; electric switch means establishing a plurality of electrical connections, operated by said operating means for said supply means; and an electrical operating circuit for said hopper valve, including therein an electrical connection established by the operation of said electrical switch means operated by the operating means for said supply means, whereby the position of said hopper valve may be predetermined by said operating means for the supply means.

ORIN WALLACE FISHER.
RALPH EDWIN WALTER.